United States Patent [19]

Credle

[11] 4,247,018

[45] Jan. 27, 1981

[54] NON-PRESSURIZED FLUID TRANSFER SYSTEM

[75] Inventor: William S. Credle, Stone Mountain, Ga.

[73] Assignee: The Coca-Cola Company, Atlanta, Ga.

[21] Appl. No.: 103,457

[22] Filed: Dec. 14, 1979

[51] Int. Cl.[3] .......................... G01F 11/00; B67D 1/00

[52] U.S. Cl. ........................................ 222/1; 137/113; 222/39; 222/64; 222/144.5; 222/145

[58] Field of Search ......................... 222/1, 14, 20–23, 222/39, 40, 52, 63–68, 129, 129.1, 136, 144.5, 145, 148; 137/113; 141/192, 198, 210–213, 216, 228, 229

[56] References Cited

U.S. PATENT DOCUMENTS

| | | | |
|---|---|---|---|
| 3,057,517 | 10/1962 | Douglas | 222/1 |
| 3,147,884 | 9/1964 | Sacco | 222/66 |
| 3,893,591 | 7/1975 | Hockmuth et al. | 222/1 |
| 3,960,295 | 6/1976 | Horak | 222/21 |
| 4,143,793 | 3/1979 | McMilln et al. | 222/1 |

*Primary Examiner*—H. Grant Skaggs
*Attorney, Agent, or Firm*—Birch, Stewart, Kolasch & Birch

[57] ABSTRACT

A non-pressurized fluid transfer system for stock rotation of liquids packaged in large non-pressurized containers such as 55 gallon drums is described. Two drums or sets of drums are used and the system automatically changes over from a first drum to a second drum when the first drum no longer contains liquid. Automatic change-over between the first drum and second drum is effected in response to a signal created by a float switch in the drum's fluid line. This float switch detects the absence of liquid in the first drum and the system automatically switches to the second drum in order to maintain continuity of the dispensing process. When the first drum is replaced with a new drum, the operator pushes a purge button and the fluid line connected to that drum is purged of any air. Thus, the dispensing of fluid may be continuously maintained without any interruption from changing drums, and without introducing air into the dispensing line.

10 Claims, 4 Drawing Figures

NON-PRESSURIZED FLUID TRANSFER SYSTEM

BACKGROUND OF THE INVENTION

1. Field of the Invention

The present invention relates to a system for stock rotation of liquids, such as soft drink syrups, contained in large non-pressurized containers such as 55 gallon drums. More specifically, the present invention relates to an automatic changeover device for automatically switching between a primary 55 gallon drum and a secondary 55 gallon drum in response to an empty condition of the primary 55 gallon drum without the interruption of the syrup supply by air in the dispensing line.

2. Description of the Prior Art

Heretofore the stock rotation or changing of liquid containers or drums such as milk, soft drink syrups or chemicals, has been accomplished by manual methods. When a container became empty, the pump system was not supplied with liquid until the packages could be manually changed. This caused unavoidable, unexpected and inconvenient delays in the dispensing operation. To provide for larger reserves many prior art systems connected packages in a parallel arrangement. This does not provide for the necessary stock rotation required by many perishable food items such as milk and soft drink syrups. Additionally, rigid types of containers having inlet and outlet openings are often connected in series. This connection does not provide complete rotation of liquid products since mixing occurs. In both series and parallel connections, a problem exists in that when all containers are empty the dispensing system must be shut down in order to replenish the supplies.

Automatic changeover devices for non-viscous liquids disposed in open or vented containers have been known in the art. However, a problem with these prior art changeover devices has been the accumulation of air at changeover in the supply lines. For large containers, such as 55 gallon drums, the amount of air in the supply lines upon changeover would be excessively large and would result in the deterioration of the quality of the dispensed product.

SUMMARY OF THE INVENTION

Accordingly, it is a primary object of the present invention to provide a device whereby two separate containers of liquid may be rotated automatically as they are emptied, allowing for package changes to be made when the time is available.

It is another object of the present invention to provide an automatic changeover device which does not need expensive pressurized containers.

It is a further object of the invention to provide an automatic changeover device which can work with any vented liquid container.

Another object of the invention is to provide an automatic changeover system which does not allow air to reach the pump or pump discharge in order to increase pump life and maintain good drinking quality of the liquid dispensed.

A further object of the invention is to provide an automatic changeover device which may completely empty one container before it starts to pump from the other container, assuring that the oldest product is always pumped first.

In the past there has been recognized a need to provide an automatic changeover device suitable for dispensing liquids which would supply a continuous output of the dispensed liquid from large containers, such as 55 gallon drums, without interruption by air caused by replacement of the containers. This need is fulfilled in the present invention by the use of two separate containers connected by dispensing lines to an automatic selector valve which chooses the container from which the liquid is to be dispatched. The selector valve causes fluid to be pumped from a first container until this container is empty. The selector valve then selects the second container and pumping is continued without interruption. The first empty container is then replaced with a third full container. To purge the line previously connected to the first container of air a purge button is actuated. The purge valve allows part of the output from the pump to be routed down the dispensing line to the first container position now occupied by the third container, releasing any air present in the dispensing line. After a predetermined time delay, the purge valve is closed and pumping operation continues on the second container until it is empty and the process is repeated.

The result of this automatic changeover device is that large containers may be used in pairs and the dispensing pump may empty one container and automatically switch to another container without air getting into the dispensing lines and without excessive operator supervision.

BRIEF DESCRIPTION OF THE DRAWINGS

The object of the present invention and the attendant advantages thereof will become more readily apparent by reference to the following drawings wherein.

DETAILED DESCRIPTION OF THE PREFERRED EMBODIMENT

Figure 1:
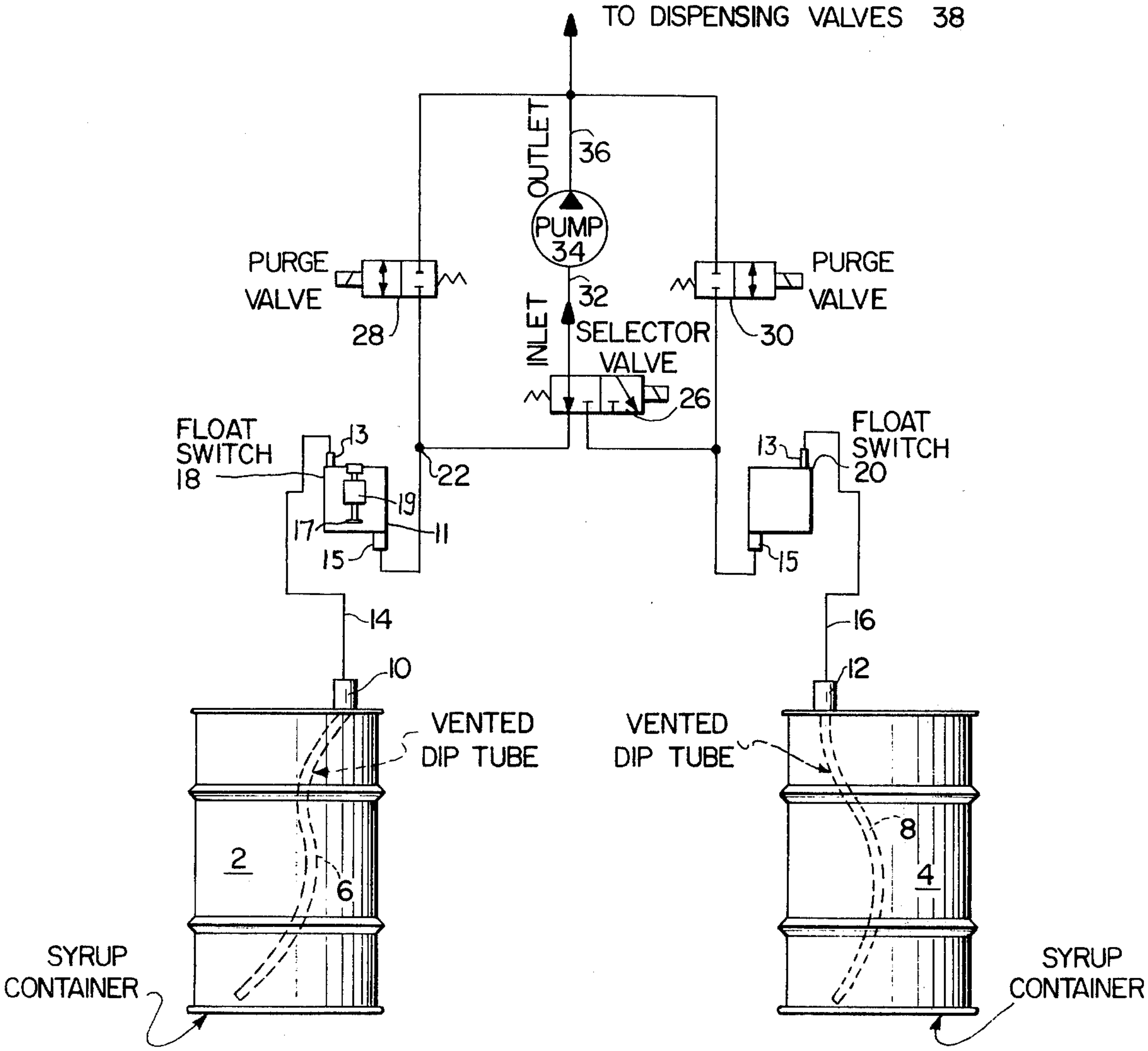
FIG. 1 is a diagrammatic view illustrating the dispensing system of the present invention.

Referring in detail to FIG. 1, there is illustrated a primary supply container 2 and a secondary supply container 4, each of which may be a 55 gallon drum. Syrup is drawn from these containers by dip tubes 6, 8 and lines 14, 16. The containers are vented through the use of vented connectors 10, 12. Float switch 18 disconnects line 14 from line 22 when the float switch detects the absence of fluid and thus air in the line 14. Float switch 20 operates in a similar fashion by shutting off line 16 from line 24 when air is detected in line 16. Syrup transfer lines 22, 24 are connected to a solenoid operated selector valve 26 which switches from one line 22 or 24 to the other when the lack of fluid is sensed by float switch 18 on the first line.

Float switch 18 includes a magnetic float 19 and a magnetic field responsive switch 17 which is actuated when the float moves in close proximity thereto. The input 13 to float switch 18 is located at the top of the fluid housing 11. The output 15 of float switch 18 is located at the bottom of fluid housing 11. Float switch 20 contains components identical to those of float switch 18, and thus these components need not be described.

The output of selector valve 26 is connected to line 32 which is in turn connected to the inlet of pneumatic pump 34. Pump 34 functions to draw syrup from containers 2 or 4, and is powered by air pressure supplied by line 40 in FIG. 2. Syrup pumped by pump 34 is supplied to the dispensing valves 38, not shown, through line 36. Purge valves 28, 30 are operative upon user command to route part of the pump output through the selected purge valve. For example, if purge valve 28 is actuated by the operator, part of the pump output is routed through line 36 and purge valve 28 to supply a pressure to line 22 to purge line 14 and dip tube 6 of air. Purge valve 30 operates in a similar fashion.

Figure 2:
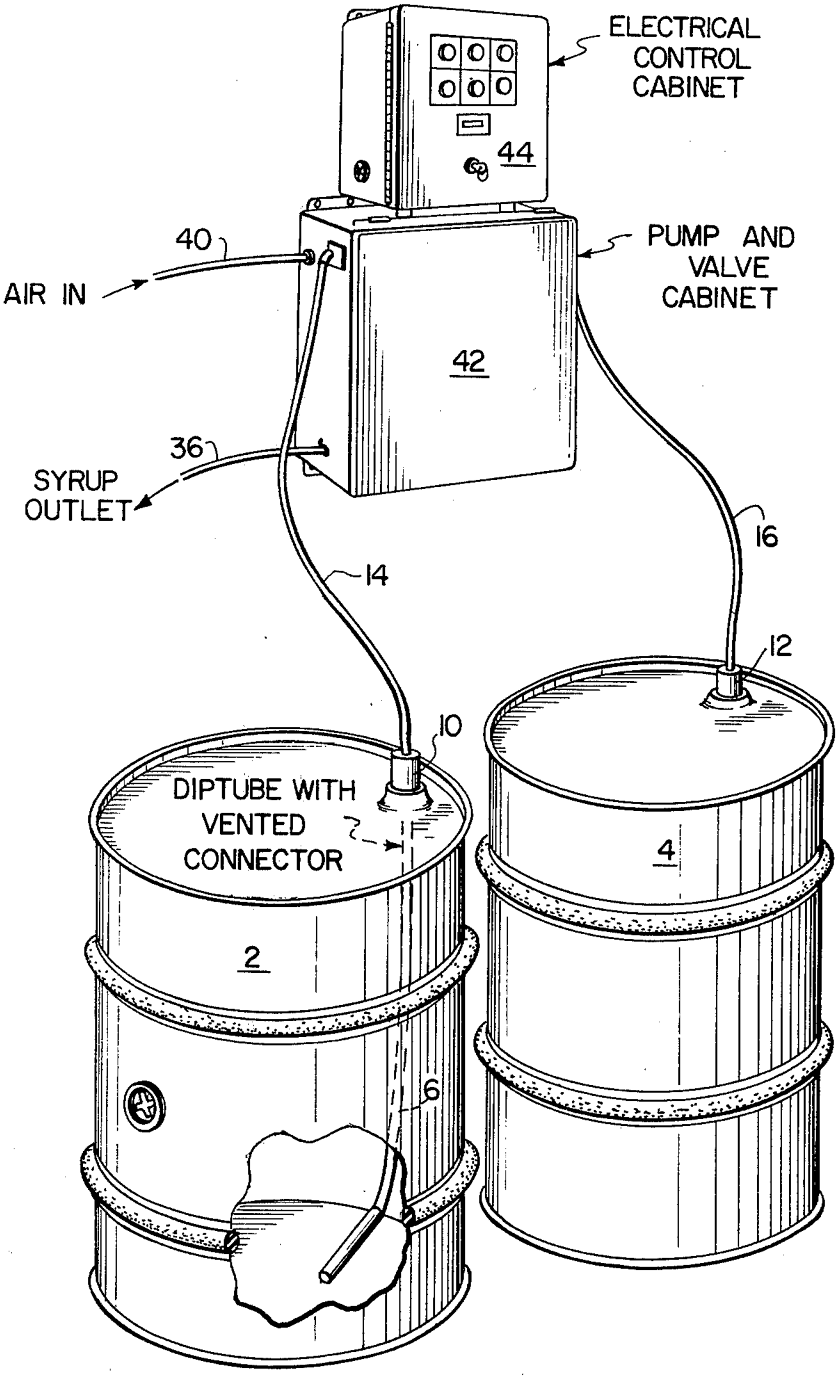
FIG. 2 is a perspective view illustrating the dispensing system of the present invention.

FIG. 2 is a perspective view of the non-pressurized fluid transfer system described in connection with FIG. 1. Like numerals show like parts of the invention. Also shown in this figure are pump and valve cabinet 42, electrical control cabinet 44 and the air input line 40 which is used to drive the pump as has already been described.

Figure 3:
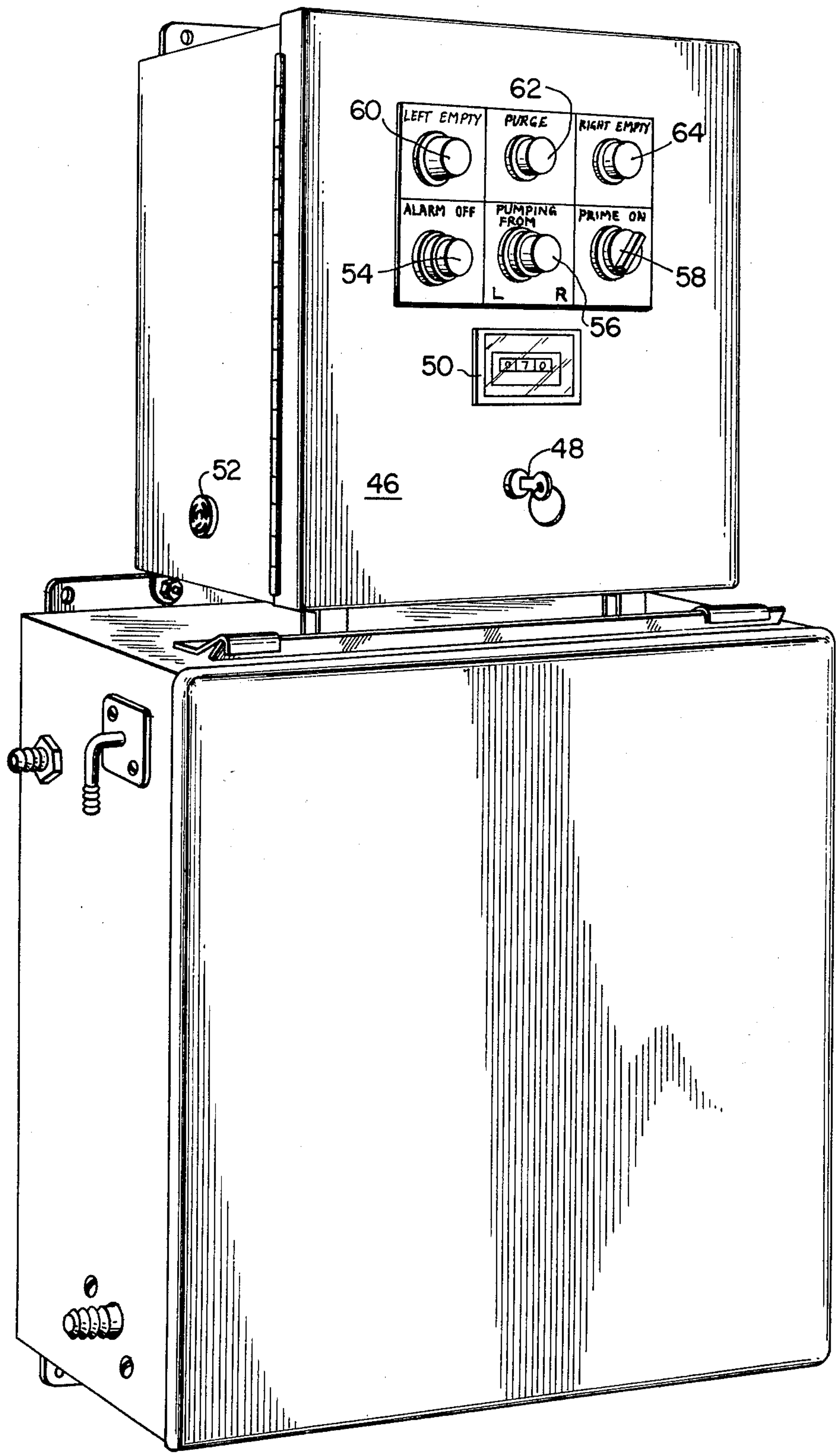
FIG. 3 is a perspective view showing the control panel of the present invention.

FIG. 3 shows the control panel of the non-pressurized fluid transfer system of the present invention. The electrical control cabinet 44 of the present invention has a cover 46 which is lockable by means of lock 48. A flow meter 50 is mounted on this cabinet for measuring the amount of syrup pumped through the syrup outlet 36. The control panel includes a left empty light 60 which is activated when the primary supply container 2 is empty, and a right empty light 64 which is activated when the secondary supply container 4 is empty. A purge button 62 is provided on the cabinet for activating one of purge valves 28, 30. The proper purge valve is automatically opened by the control to be described in connection with FIG. 4. The system of the present invention includes an alarm which is activated when one of the float switches detect an empty condition in one of the containers. This alarm 52 is disposed on the side of the electrical control cabinet 44. The alarm continues to sound until the alarm off button 54 is depressed.

Prime on button 58 is used to prime the system when beginning operation. The system is automatically priming and all lines are filled with syrup before the prime operation is terminated. The operator may also manually select between the primary and secondary supply containers through the use of the "pumping from" switch 56 which also indicates the container from which pumping occurs by the use of indicator lights.

Figure 4:
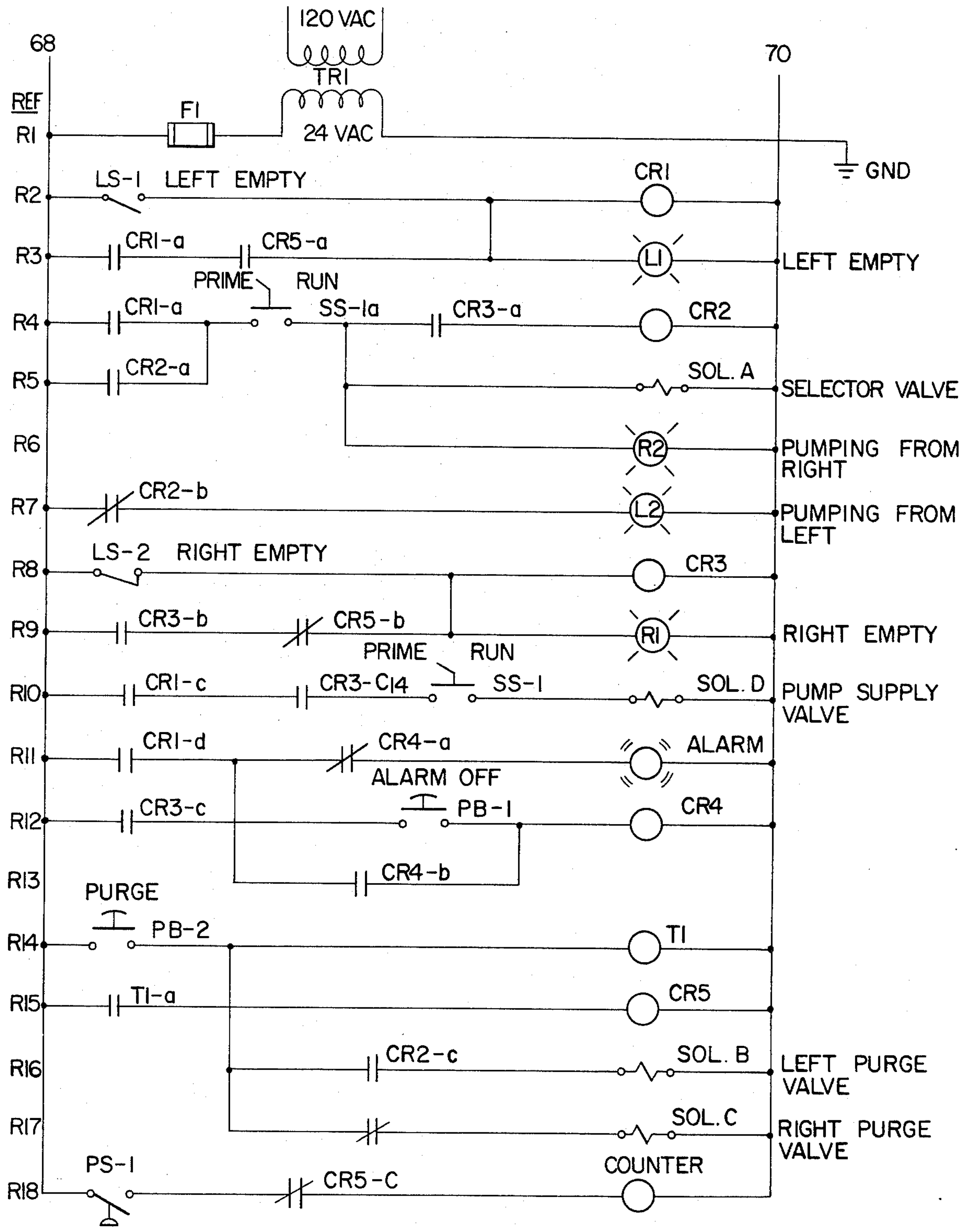
FIG. 4 is a schematic of the control circuitry of the present invention.

FIG. 4 shows a schematic of one embodiment of the control circuitry of the present invention. Power is supplied to the control circuitry from a 120 volt A.C. line to the input of main power transformer TR1. The output of transformer TR1, the form of 24 volts A.C., is fed to positive control supply voltage line 68 through fused connection F1, and to negative control power line 70 which is connected to ground GND. The circuitry of the preferred embodiment shown in FIG. 4, is arranged in parallel branches, and as such, may best be described from top to bottom as viewed in FIG. 4. Beginning at the top of FIG. 4, a first parallel branch R2, includes in series, left empty switch LS-1 and a first relay CR1.

The next parallel branch R3 includes in series a first normally open contact of the first relay CR1-a, a first normally closed contact of the fifth relay CR5-a and the left empty light L1. The junction between the left empty switch LS1 and the first relay CR1 is connected to the junction between the first normally closed contact of the fifth relay CR5-a and the left empty light L1.

The next parallel branch R4 includes in series the second normally open contact of the first relay CR1-b, a first prime-run switch contact SS-1a, the first normally contact of the third relay CR3-a, and the second relay CR2. The first normally open contact of the second relay CR2-a is connected between the positive control supply voltage line 68 and the junction between the second normally open contact of the first relay CR1-b and the first contact of the prime-run switch contact SS-1a. The selector valve solenoid SOL. A is connected between the negative control supply voltage line and the junction between the first prime-run switch contact SS-1a and the first normally closed contact of the third relay CR3-a. The pumping from right light R2 is also connected between the negative control voltage line 70 and the junction between the first prime-run switch contact SS-1a and the first normally closed contact of the third relay CR3-a.

The next parallel branch R7 includes in series the second normally closed contact of the second relay CR2-b and the pumping from left light L2.

The next parallel branch R8 includes in series the right empty switch LS-2 and the third relay CR3.

The next parallel branch of the control circuit of the present invention includes in series the second normally open contact of the third relay CR3-b, the second normally closed contact of the fifth relay CR5-b, and the right empty light R1. The junction between the second normally closed contact of the fifth relay CR5-b and the right empty light R1 is connected to the junction between the right empty switch LS-2 and the third relay CR3.

The next parallel branch R10 includes in series the third normally open contact of the first relay CR1-c, the third normally open contact of the third relay CR3-c, the second primerun switch contact SS-1c, and solenoid SOL-D.

The next parallel branch R11 of the control circuit includes in series, the fourth normally open contact of the first relay CR1-d, the first normally closed contact of the fourth relay CR4-a, and the ALARM.

The next parallel branch R12 includes in series the third normally open contact of the third relay CR3-c, the ALARM-OFF pushbutton PB-1 and the fourth relay CR4. The junction between the third normally open contact of the third relay CR3-c and the ALARM-OFF pushbutton PB-1 is connected to the junction between the fourth normally open contact of of the first relay CR1-d and the first normally closed contact of the fourth relay CR4-a. A second normally open contact of the fourth relay CR4-b is connected between the junction of the third normally open contact of the third relay CR3-c and the ALARM-OFF pushbutton PB-1 and the junction between the other terminal of the ALARM-OFF push-button PB-1 and the control relay CR4.

The next parallel branch R14 includes in series a purge pushbutton PB-2 and a time delay relay 11.

The next parallel branch R14 of the control circuit includes in series the contact associated with the time delay relay T1-a and fifth relay CR5. A series connection of the third normally open contact of the second relay CR2-c and the left purge valve solenoid SOL-B is connected between the junction of the contact associated with the time delay relay T1-a and the fifth relay CR5, and the negative control supply voltage line 70. A series connection of the fourth normally closed contact of the second relay CR2-d and the right purge valve solenoid SOL-C is also connected between the negative control supply voltage line 70 and the junction between the contact associated with the time delay relay R1-a and the fifth relay CR5.

The last parallel branch R18 includes in series, pressure switch PS-1, the third normally closed contact of the fifth relay CR5-c and the COUNTER (50 in FIG. 3).

Thus, all of the electrical circuit connections illustrated in FIG. 4 enable the operation of the fluid transfer system of the present invention.

DESCRIPTION OF OPERATION

With the system in operation and dispensing fluid from container 2, the fluid is drawn out of container 2 through dip tube 6, line 14, float switch 18, line 22, selector valve 26, and line 32 to the pump 34. Pump 34 pumps the fluid from the container 2 to the dispensing valves 38 through outlet line 36. Container 2 is vented through the use of vented connector 10 to prevent a vacuum from forming within the container.

When all the syrup is drawn from syrup container 2, the syrup level in float switch 18 drops until magnetic float 19 actuates the magnetic field responsive switch 17. It is important that the input 13 of float switch 18 be located near the top of reservoir 11 and also that the output 15 of float switch 18 be located near the bottom of float switch reservoir 11 so that no air will be allowed to escape from the switch. The output of float switch 18 causes selector valve 26 to switch from line 22 to line 24.

Pump 34 now pumps syrup from secondary container 4 to the dispensing valve 38 without interruption. The closing of float switch 18 also activates left empty light 60. This light remains on until the operator replaces the primary supply container 2 and purges the line 14 and dip tube 6 of air. The closing of float switch 18 also activates an alarm 52 which continues to sound until the operator pushes alarm-off button 54 indicating that he is aware of the empty container condition.

The operator should now replace the empty container 2 with a new container as soon as possible because when container 4 is empty the system will automatically switch back to container 2 unless this container is sensed to be empty. Once the operator has replaced container 2 with a new container, the purge button 62 is pushed, opening the proper purge valve.

Pushing the purge button causes the proper purge valve to open. The proper purge valve is determined by the position of the selector valve 26. This purge valve remains open until time delay relay T1 allows the purge valve to close. In the purging operation, the syrup is pumped past float switch 18 and through line 14 and dip tube 6, until both are purged of any air. This time delay associated with relay T1 is sufficient to allow the air to be pumped from float switch 18, line 14, and dip tube 6 out of vented connector 10. Float switch 18 senses the presence of syrup within it and automatically turns off left empty light 60.

When container 4 is sensed to be empty by float switch 20, the process is again repeated. Float switch 20 sends a signal to electrical control cabinet 44 lighting the right empty light 64 and turning on alarm 52. Float switch 20 also causes selector valve 26 to switch from line 24 to line 22 and the replacement primary container 2. This is done only in the absence of the left empty signal. If a left empty signal still exists when the right empty signal is detected, the system will shut down.

The operator, hearing the alarm signaling that the secondary supply container is empty, turns off the alarm using alarm-off switch 54, replaces empty container 4 with a new container, and presses the purge switch so that purge valve 30 is actuated. Again, the proper purge valve is automatically activated by the control shown in FIG. 4. Purge valve 30 remains on for a predetermined time sufficient to purge float switch 20, line 16, and dip tube 8 of any air left in them. Float switch 20 senses the presence of syrup within it and causes right empty light 64 to turn off.

Thus, it can be seen that as long as the operator promptly replaces the empty container with a new container and presses the purge button, the system will remain free of air and will continue to operate as long as properly supervised.

To begin a new operation of the system when both containers are new, the containers 2, 4 are connected into the system. Prime on switch 58 on the electrical control cabinet 44 is turned on to by-pass the float switches 18, 20 and pump all air out of the system. The pumping from switch 56 is then placed at the desired position, L for left, or R for right, and the system begins pumping. Pumping continues in the manner mentioned above.

The control shown in FIG. 4 operates as follows. When left empty switch LS1 corresponding to float switch 18 closes, signaling the lack of fluid within float switch 18, first relay CR1 is actuated and left empty light L1 or 60 is turned on. This closes contact CR1-a associated with first relay CR1 to latch relay CR1 open and also to keep left empty light L1 activated.

First relay CR1 simultaneously closes the second contact CR1-b associated with it to activate relay CR2 and the selector valve solenoid SOL-A, assuming the system is in the run mode with switch SS-1 closed. This turns on pumping from right light R2 and causes second relay CR2 to close the first contact CR2-a associated with it to latch relay CR2 on. Simultaneous to this, second relay CR2 opens the second normally closed contact CR2-b associated with it to turn off pumping from left light L2. Thus, the system continues to pump on the right side as selector valve solenoid SOL-A remains actuated. When the operator replaces empty container 2 with a new container, purge button 62 is pushed closing contact PB2 and actuating time delay relay T1 and fifth control relay CR5. The contact TI-a associated with time delay relay T1 latches time delay relay T1 and fifth control relay CR5 on until a predetermined time period sufficient to purge the syrup lines of any air has passed. When purge button PB2 is pushed the proper purge valve SOL-B or SOL-C is actuated, depending on the state of second relay CR2 and its respective contacts CR2-c and CR2-d. Thus, the system is purged.

When right empty switch LS-2 senses an empty condition, third relay CR3 opens normally closed contact CR3-a to prevent the second relay CR2 from being actuated. Contact CR3-b is closed to latch on relay CR3 and turn on right empty light R1. Thus, this portion of the circuit operates in a manner similar to the circuitry corresponding with left empty switch LS-1.

When one of the syrup containers is empty and one of the empty switches LS-1 or LS-2 is actuated causing the first or third control relay CR1 or CR3 to actuate, the alarm is actuated. The alarm may be turned off by pushing ALARM-OFF button PB-1 to actuate the fourth relay CR4 to open normally closed contacts CR4-a and to latch itself on using normally open contact CR4-b. Thus, the alarm remains off until both syrup containers are filled and then one is emptied to actuate either the first relay CR1 or the third relay CR3.

If both the first syrup container 2 and the second syrup container 4 are simultaneously empty and the system is in the run mode, SOL-D is actuated to turn off the syrup pump by closing a pneumatic valve. Thus, the pumping operation is terminated.

Counter 50 is incremented by successive closings of switch PS1 which is a positive displacement pump cycle switch which closes each pump cycle. Normally closed contacts CR5-c are open during the purging operation to prevent the counter 50 from incrementing during the purge operation.

It should be understood that the system described herein may be modified as would occur to one of ordinary skill in the art without departing from the spirit and scope of the present invention.

We claim:

1. An automatic changeover fluid dispensing system for continuously dispensing fluid comprising:

first and second fluid supply means, each having an output tube and including at least one replaceable container for containing the fluid to be dispensed;

pump means for drawing said fluid out of one of said liquid supply means when in fluid connection thereto;

selector valve means in fluid connection with said pump means for switching fluid connection from one of said fluid supply means to the other, said selector valve means being actuated in response to a lack of fluid in the containers of the previously selected one of said fluid supply means; and purge valve means for filling the output tube of the previously selected one of said fluid supply means after the empty containers are replaced with full containers, said purge valve means causing air present in said output tube to be displaced by said fluid to thereby maintain a continuous supply of fluid to the output of said pump.

2. The automatic changeover system of claim 1 wherein said purge valve means uses part of the output of the pump means for filling the output tube of the previously selected one of said fluid supply means.

3. The automatic changeover system of claim 2 further comprising:

first and second float switch means, each in fluid connection with an output tube of said first and second fluid supply means, for switching said selector valve means.

4. The automatic changeover fluid dispensing system of claim 3 further comprising:

alarm means responsive to the closing of said first or second float switch means for audibly notifying the operator that the containers of one of said first or second fluid supply means are empty.

5. The automatic changeover fluid dispensing system of claim 4 further comprising:

indicator light means for visually notifying the operator which of said first or second fluid supply means has empty containers.

6. The automatic changeover fluid dispensing system of claim 5 wherein the containers of said first and second fluid supply means are vented.

7. The automatic changeover fluid dispensing system of claims 1,2, or 3 wherein the dispensed fluid is beverage syrup, and the output of said pump means is connected to a plurality of beverage dispensing valves.

8. The automatic changeover system of claim 6 where the system will continue to operate indefinitely without interruption by switching between said first and second fluid supply means when empty containers are quickly replaced with full containers by the operator.

9. A method of automatically dispensing liquid without interruption, from a plurality of containers, including the steps of:

pumping liquid from a first container using an output tube;

sensing when said first container is empty;

actuating a selector valve in response to the emptying of the first container to select a second container;

pumping from the second container using a second output tube;

replacing the first empty container with a full new first container; and purging the air from the system by routing some of the fluid pumped from the second container into the output tubes connected to said new first container which has replaced said first container.

10. The method of claim 9 further including the step of:

repeating the operation by switching between said containers to continue pumping fluid without interruption.

* * * * *